Aug. 13, 1935.  A. F. FISHER ET AL  2,011,102

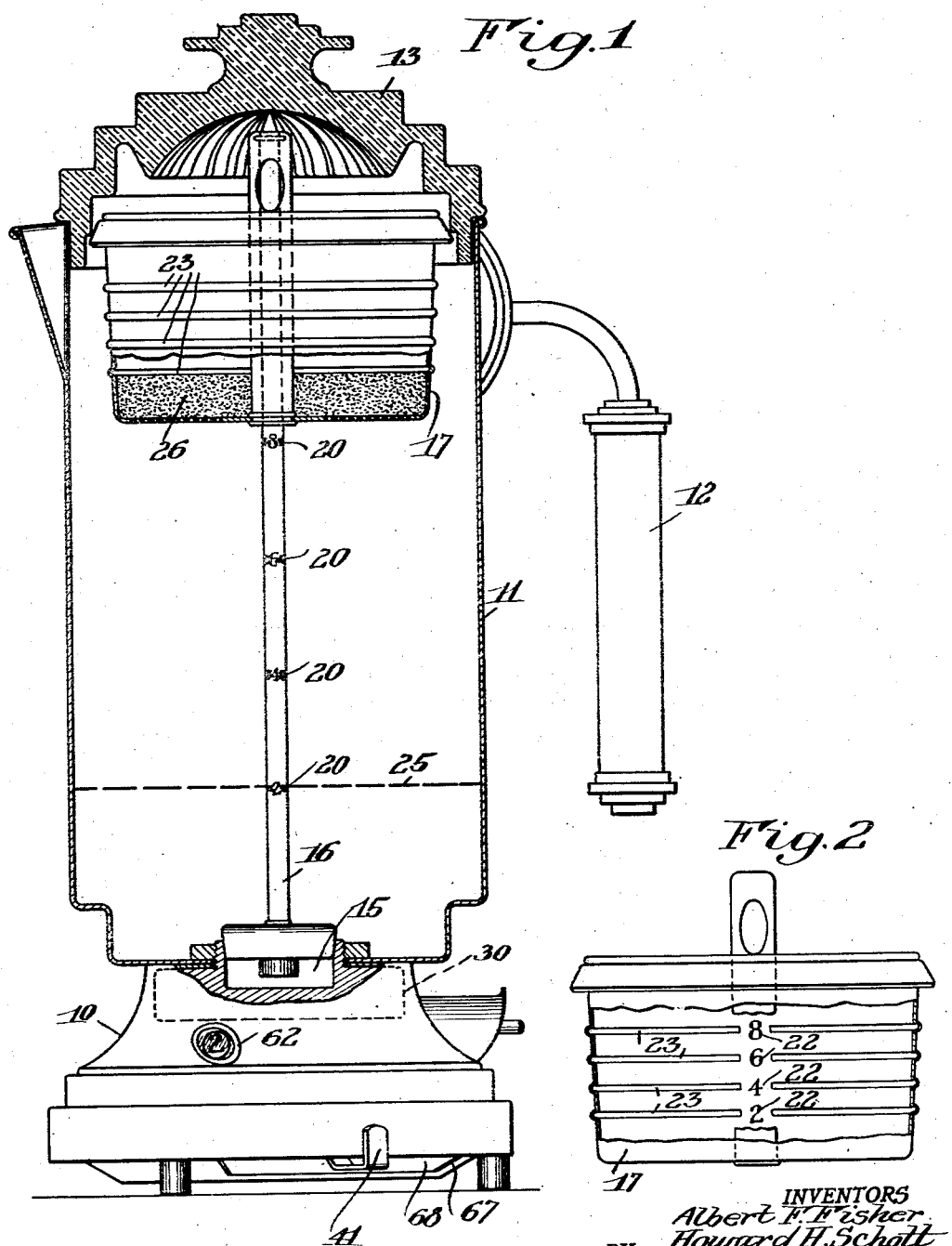

COFFEE MAKING APPARATUS

Filed Jan. 24, 1934   2 Sheets-Sheet 2

INVENTORS
Albert F. Fisher
BY Howard H. Schott
Edward H. Cumpston
their ATTORNEY Patented Aug. 13, 1935

2,011,102

UNITED STATES PATENT OFFICE 2,011,102

COFFEE MAKING APPARATUS

Albert F. Fisher, Brighton, and Howard H. Schott, Rochester, N. Y., assignors to Robeson-Rochester Corporation, Rochester, N. Y., a corporation of New York Application January 24, 1934, Serial No. 708,120

2 Claims. (Cl. 53—3)

This invention relates to coffee making apparatus, and more particularly to domestic coffee making apparatus such as is commonly used in the home, by means of which variable quantities of coffee beverage can be made.

When using various types of domestic coffee making apparatus, such, for example, as percolators, the user frequently does not wish to make the maximum quantity of beverage which can be made in the particular apparatus at hand. Difficulty may be encountered by failure to estimate properly the correct amount of water and of ground coffee to be placed in the apparatus for producing the desired amount of beverage, and difficulty also occurs with regard to the time element, the percolator or other apparatus sometimes being turned off too soon or allowed to heat too long.

The present invention has for its object the provision of improved apparatus with which even inexperienced persons can make variable amounts of coffee beverage, as desired, without guesswork and without having unsatisfactory results. It is, accordingly, another object of the invention to provide apparatus graduated to show the correct amounts of water and coffee to be placed in the apparatus for producing any desired quantity of coffee beverage, and also to provide means for indicating the proper length of time for heating when it is desired to produce various quantities of beverage.

To these and other ends the invention resides in certain improvements and combinations of parts, all as will be hereinafter more fully described, the novel features being pointed out in the claims at the end of the specification.

In the drawings:

Fig. 1 is a vertical section taken substantially centrally through coffee making apparatus constructed in accordance with a preferred embodiment of the invention;

Fig. 2 is an elevation, with parts broken away and parts in vertical section, of the coffee basket or receptacle forming a part of the apparatus shown in Fig. 1;

The same reference numerals throughout the several views indicate the same parts.

Figure 3:
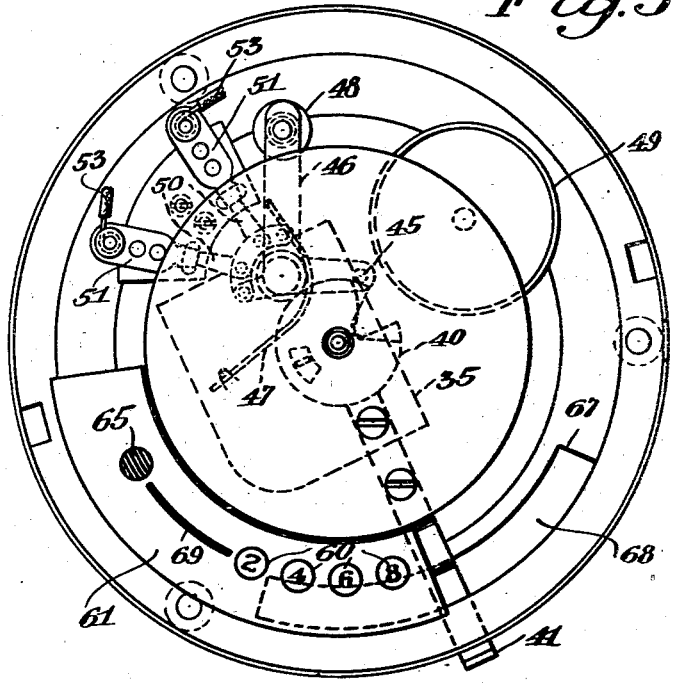
Fig. 3 is a diagrammatic plan of part of the mechanism in one position.

The drawings show, by way of example, coffee making apparatus comprising a base 10, on which is mounted a water container or receptacle 11 provided with a suitable and convenient handle 12, and a removable cover 13 which, in the embodiment here shown, may be made entirely of glass having the shape and characteristics best understood by reference to Fig. 1 of the drawings.

At the lower part of the water container 11 is a heating well 15, from which rises a fountain tube 16 on the upper end of which is removably mounted a coffee basket or receptacle 17 for holding ground coffee in known manner, so that as water is heated in the well 15, it is forced up through the fountain tube 16 and sprayed over the coffee in the receptacle 17, seeping down through the coffee and through perforations in the bottom of the receptacle in order to extract the essence from the ground coffee and make a beverage in the manner commonly done in coffee making apparatus of the type frequently known as percolators.

According to the present invention, graduations are provided in connection with the water container 11 and the coffee receptacle 17, for indicating the various extents to which these respective articles should be filled in order to make any desired quantity of coffee beverage, within the range or limit of the particular apparatus. In the embodiment here shown, by way of example, the apparatus will make a maximum of eight cups of beverage, and the graduations associated with the water receptacle 11 are arranged on the fountain tube 16, as indicated at 20 in Fig. 1. Preferably these graduations bear indicia reading directly in terms of number of cups of beverage. For example, the indicia on the fountain tube 16 may include the numeral "2" at one elevation so placed that when the container 11 is filled with water up to the level of the numeral "2", there will be slightly more than two cups of water in the container, sufficient to make two cups of beverage. Somewhat above this numeral "2" is the graduation "4" indicating the proper point to which to fill the receptacle 11 in order to make four cups of beverage. Similarly, above this, are the respective graduations "6" and "8". In addition to the numeral itself, each graduation may also comprise a more or less conspicuous line extending around the fountain tube 16 at the elevation of the numeral, as plainly indicated in Fig. 1 of the drawings.

With this arrangement, it is not necessary to estimate the quantity of water by guess, nor to measure it out by means of a measuring cup. All that it is necessary to do is for the user, with the fountain tube 16 in place, and with the cover 13 and coffee basket 17 removed, to pour water into the container 11 until the water level reaches the desired graduation indicating the number of cups of coffee which it is desired to make. The word "cup" as herein used as a measure of volume or quantity of liquid is intended to mean the usual quantity of liquid ordinarily held in a coffee cup of ordinary size, this amount usually being about or slightly less than half a pint.

Similarly, the coffee basket or receptacle 17 bears graduations, as indicated at 22 in Fig. 2 of the drawings. These graduations preferably are in the form of numerals of the same numerical value as the numerals on the fountain tube 16, and the numerals themselves may be supplemented by further graduations in the form of grooves or lines 23 extending circumferentially around the coffee basket at the respective elevations of the numerals 22. These graduations 22 and 23 indicate the proper extent to which to fill the coffee receptacle 17 with ground coffee in order to make any desired number of cups of beverage, the numerals 22 reading directly in terms of number of cups.

For example, if it is desired to make two cups of coffee, the water container 11 is filled with water up to the elevation of the numeral "2" of the graduations 20 which are associated with this water container, this elevation being indicated by the dash line 25 in Fig. 1. The coffee basket 17 is filled with properly ground coffee up to the elevation of the graduation "2" of the series of graduations 22 associated with the coffee basket. Such a quantity of ground coffee is indicated diagrammatically at 26 in Fig. 1. Thus, without the necessity of using any measuring implements or of guessing at approximate quantities, the user of the apparatus knows that the proper quantity of water and the proper quantity of coffee have been placed in the apparatus to make two cups of beverage. Similarly if any other desired number of cups of beverage are to be made, the water container and coffee basket are filled to the proper elevations indicated by the numerals of their respective graduations, reading directly in terms of number of cups.

In the base 10 of the apparatus is an electric heating element 30 for heating the water in the well 15 in known manner. Below this heating element 30 is timing mechanism indicated in general at 35 in Figs. 3 and 4 of the drawings, which timing mechanism is of any suitable form settable to run for various different selective periods of time, and after running for the selected length of time, to operate a signal, or throw a switch, or the like.

In the form here shown the timing mechanism includes a disk 40 connected to a setting arm 41 accessible from the exterior of the apparatus, as shown in Fig. 1. The disk 40 is operatively connected to a gear train, indicated diagrammatically and in general by the numeral 42, which is controlled by any suitable means, such as the escapement pallet 43. A spring is operatively connected in known manner to the disk 40 to tend to turn this disk in a counterclockwise direction when viewed from the top, as in Figs. 3 and 4, the turning movement under the influence of the spring being slowed down or retarded by the gear train 42 and escapement pallet 43 so that the disk 40 turns only relatively slowly and at a uniform rate.

Figure 5:
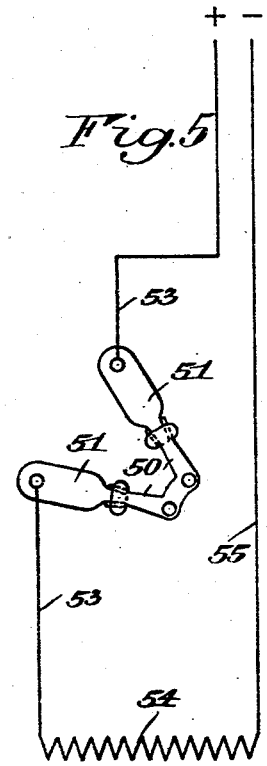
Fig. 5 is a diagrammatic view of the heating element and switch for controlling it.
Figure 4:
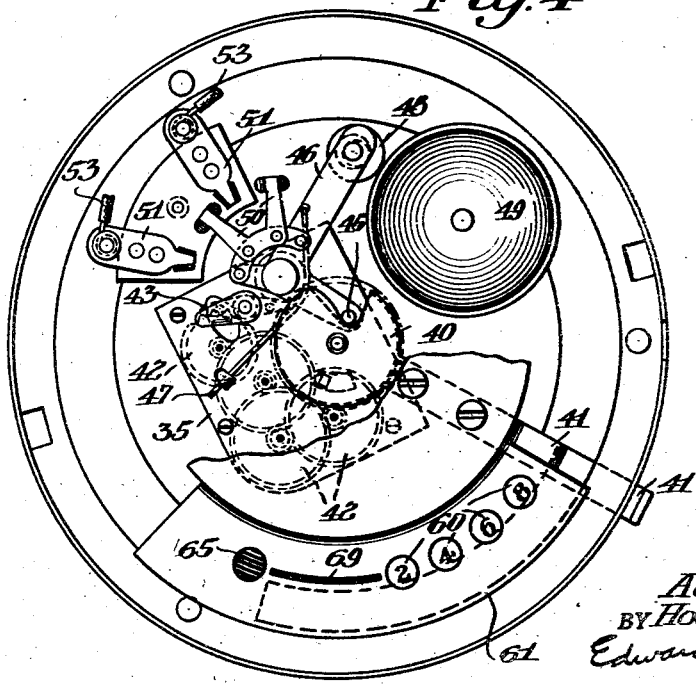
Fig. 4 is a similar view showing the mechanism in another position.

When the disk 40 reaches a predetermined position in its counterclockwise rotation, it operates a signal, or throws a switch, or both. For example, at the predetermined point, a pin 45 on one arm of a bell crank lever 46 may drop into a notch in the disk 40 so that the bell crank lever 46 is turned, under the influence of a spring 47, to throw a clapper 48 against a bell 49, thus giving an audible signal. The bell crank lever 46 may also carry switch contact elements 50 which, when the pin 45 is not in the notch of the disk 40, contact with the circuit elements 51 and complete a circuit between them, as indicated in Figs. 3 and 5. When the pin 45 drops into the notch of the disk 40, however, the turning of the bell crank lever 46 throws the elements 50 carried thereby out of contact with the circuit elements 51, and thus breaks the circuit, as shown in Fig. 4 of the drawings.

The circuit elements 51 may form part of an electric circuit leading to the heating element, being interposed, for example, in a conductor 53 (Fig. 5) leading from any suitable source of electric energy to one end of a resistance element 54 which forms part of the heating member 30, another conductor 55 leading from the source of current to the other end of the resistance 54.

According to the present invention, the timing mechanism has associated with it suitable graduations, or scale means, for indicating the position to which it should be set in order to have it operate for the required time interval appropriate to the amount of beverage to be made. When, for example, only two cups of coffee are to be made, it takes less time to heat the water initially and to percolate the coffee after heating, than it does if, for example, six or eight cups of beverage are to be made.

In the preferred embodiment, the graduations are in the form of numerals 60 conspicuously formed on an arcuate plate 61 fastened to the setting lever 41 and moved therewith, the respective numerals 60 being observable through a window 62 formed at a suitable point in the base 10, as shown in Fig. 1. The numerals 60 preferably are graduated, like the graduations 20 and 22, to read directly in terms of number of cups of coffee to be made.

From the preceding description, it is seen that if the setting lever 41 be moved leftward to turn the disk 40 in a clockwise direction, and then released, the above mentioned spring connected to the disk 40 will turn the disk back in a counterclockwise direction until, near the end of its movement, the pin 45 drops into the notch on the disk. The extent to which the setting lever 41 is moved leftwardly from its normal or rest position determines the length of time during which the timing mechanism will operate before the pin 45 drops into the notch and gives the signal, or opens the switch, or both. The graduations 60 on the plate 61 are so placed with reference to the window 62 that when, for example, the numeral "2" of the graduations 60 is observable through the window 62, the lever 41 is set in proper position so that the timing mechanism operates approximately long enough to allow time for making two cups of coffee. Similarly, if the lever 41 be moved slightly farther to the left until the numeral "4" appears through the window 62, the timing mechanism will operate for a somewhat greater interval, allowing sufficient time for the making of four cups of coffee, and so on with the other graduations.

A conspicuous indication, such as shown at 65, may be placed on the plate 61 in position to appear through the window 62 when the lever 41 and disk 40 are in their normal rest position, which position is determined by contact of the lever 41 with the end 67 of a slot 68 through which the lever extends, just after the pin 45 drops into the notch. A line 69, of any suitable form, may also be placed on the plate 61 between the indication 65 and the first of the numerical graduations 60. Whenever this line 69 appears through the window 62, it will indicate that the timing mechanism is not in its normal position of rest but, if running, still has some distance to go. When the indication 65 appears through the window 62, this gives a visible indication or signal that the parts have reached their normal position of rest, so that if the attendant did not happen to hear the audible signal 49, he can nevertheless observe the visible signal 65 and know that the time interval for which the timing mechanism was set has now expired.

At the expiration of the time interval, the mechanism automatically opens the switch 50, 51, if the switch is used, or if no such automatic switch is employed, the attendant, upon hearing the bell 49 ring, or upon observing the visible signal 65, knows that it is time to turn off the heating element by hand.

It is realized that the proper time of heating not only depends upon the quantity of beverage to be made, but also depends, to some extent, upon the initial temperature of the water when it is placed in the container 11, and upon the strength of coffee which it is desired to make. This, of course, can not be conveniently allowed for in a simplified practical form of timing mechanism, but the timing mechanism preferably is designed in accordance with average lengths of time required for making coffee of average strength, starting with water of average lukewarm temperature. If the user starts with hot water, he can move the setting lever 41 not quite as far to the left as he would otherwise do, or he can move it to the proper setting at which the number of cups to be made appears through the window 62 and then turn off the heating element by hand when he thinks the coffee has percolated long enough.

It will be seen that exceedingly simple apparatus has been provided, which eliminates many of the uncertainties heretofore present in making coffee. The quantities of water and of ground coffee to be put in are indicated by the graduations 20 and 22, respectively, while the proper length of time of heating is indicated by the timing mechanism. The user simply sets the lever 41 to the point where the desired numeral (reading directly in terms of number of cups of coffee) appears through the window 62, then he releases the lever 41 and the timing mechanism operates for the required length of time, after which it indicates the time for turning off the heat by the audible signal 49 and the visible signal 65, at the same time actually turning off the heat automatically by opening the switch 50, 51, if such a switch is included.

Fig. 1 of the drawings illustrates the apparatus in condition for making two cups of coffee. The container 11 is filled with water up to the level 25, which is at the height of the graduation "2", to indicate the water level for two cups of coffee; the coffee basket 17 has been filled with coffee 26 up to the graduation "2"; and the timing mechanism has been set so that numeral "2" appears through the window 62, as shown. This makes clear the great convenience and utility of these graduations.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. Coffee beverage making apparatus comprising a water holding receptacle and a coffee holding receptacle in operative relationship to each other, means for heating water in said water receptacle, timing mechanism adjacent said heating means and settable to different positions for signalling various different time intervals, graduations associated with said water receptacle for indicating various levels to which said receptacle should be filled with water for producing various quantities of beverage respectively indicated by said graduations, corresponding graduations associated with said coffee receptacle for indicating the respective levels to which said receptacle should be filled with coffee for producing the various quantities of beverage respectively indicated by said graduations associated with said water receptacle, and corresponding graduations associated with said timing mechanism for indicating various different positions to which said mechanism should be set in order to signal various different time intervals respectively appropriate for heating the respective different quantities of water indicated by said graduations associated with said water receptacle.

2. Coffee beverage making apparatus comprising a water holding receptacle and a coffee holding receptacle in operative relationship to each other, means for heating water in said water receptacle, timing mechanism adjacent said heating means and settable to different positions for signalling various different time intervals, and three sets of graduations, one associated with said water receptacle, one associated with said coffee receptacle, and one associated with said timing mechanism, and all bearing substantially identical indicia, for indicating respectively the proper amount of water to be used for making a predetermined quantity of beverage, the proper amount of coffee to be used in making the same predetermined quantity of beverage, and the proper setting of said timing mechanism to cause it to signal a proper time interval during which said heating means will normally sufficiently heat the water to make said predetermined quantity of beverage.

ALBERT F. FISHER.
HOWARD H. SCHOTT.